United States Patent [19]

Hara

[11] Patent Number: 5,633,655
[45] Date of Patent: May 27, 1997

[54] TELEVISION IMAGE PROCESSING APPARATUS

[75] Inventor: Zenichiro Hara, Nagasaki, Japan

[73] Assignee: Mitsubishi Denki Kabushiki Kaisha, Tokyo, Japan

[21] Appl. No.: 390,946

[22] Filed: Feb. 21, 1995

Related U.S. Application Data

[63] Continuation of Ser. No. 718,570, Jun. 20, 1991, abandoned.

[30] Foreign Application Priority Data

Jun. 22, 1990 [JP] Japan .................................. 2-165126

[51] Int. Cl.$^6$ .................................................. G09G 5/00
[52] U.S. Cl. ........................... 345/132; 345/903; 348/383
[58] Field of Search ..................................... 340/731, 701, 340/703, 793, 812, 814; 382/47; 345/905, 903, 154, 3, 132, 73–75, 82, 83; 358/183; 348/441, 443, 448, 383, 798, 801

[56] References Cited

U.S. PATENT DOCUMENTS

| | | | |
|---|---|---|---|
| 4,121,283 | 10/1978 | Walker | 340/721 X |
| 4,631,692 | 12/1986 | Broedner | 340/701 X |
| 4,746,981 | 5/1988 | Nadan et al. | 358/183 |
| 4,771,278 | 9/1988 | Pooley . | |
| 4,833,542 | 5/1989 | Hara et al. | 345/903 |
| 4,901,155 | 2/1990 | Hara et al. | 345/75 |
| 5,189,401 | 2/1993 | Kugler | 345/132 |
| 5,218,274 | 6/1993 | Zenda | 345/3 |

FOREIGN PATENT DOCUMENTS

| | | |
|---|---|---|
| 0195998 | 10/1986 | European Pat. Off. . |
| 56-4185 | 1/1981 | Japan . |
| 60-237775 | 11/1985 | Japan . |
| 60-237774 | 11/1985 | Japan . |
| 63-21693 | 1/1988 | Japan . |
| 63-48083 | 2/1988 | Japan . |
| 5037876 | 2/1993 | Japan .................................. 348/383 |
| 2179185 | 2/1987 | United Kingdom . |

*Primary Examiner*—Richard Hjerpe
*Assistant Examiner*—Kara Farnandez Stoll

[57] ABSTRACT

A television image processing system is selectively connectable with a plurality of displays which are different in display format. The television image processing system includes a command outputting section for outputting a command representative of the display format of a display connected with the television image processing system. It further includes a sampling section for receiving an analog color TV signal and for outputting a digital image data for each of color components. Finally it includes and at least one data array changing section for receiving the image data and for forming an array of image data compatible with the display format specified by the command, the array of image data being supplied to the display connected with the television image processing system.

11 Claims, 12 Drawing Sheets

| | | | | | | | |
|---|---|---|---|---|---|---|---|
| B0101 | G0101 | B0102 | G0102 | B0103 | G0103 | | |
| G0101 | R0101 | G0102 | R0102 | G0103 | R0103 | | |
| B0201 | G0201 | B0202 | G0202 | B0203 | G0203 | | |
| G0201 | R0201 | G0202 | R0202 | G0203 | R0203 | | |
| B0301 | G0301 | B0302 | G0302 | B0303 | G0303 | | |
| G0301 | R0301 | G0302 | R0302 | G0303 | R0303 | | |

⇕

(I)

| B0101 | G0102 | B0103 | G0104 | B0105 | G0106 | | |
|---|---|---|---|---|---|---|---|
| G0201 | R0202 | G0203 | R0204 | G0205 | R0206 | | |
| B0301 | G0302 | B0303 | G0304 | B0305 | G0306 | | |
| G0401 | R0402 | G0403 | R0404 | G0405 | R0406 | | |
| B0501 | G0502 | B0503 | G0504 | B0505 | G0506 | | |
| G0601 | R0602 | G0603 | R0604 | G0605 | R0606 | | |

TELEVISION IMAGE PROCESSING APPARATUS

This application is a continuation of application Ser. No. 07/718,570 filed on Jun. 20, 1991, now abandoned.

BACKGROUND OF THE INVENTION

1. Field of the Invention

The present invention relates to a television image processing apparatus for outputting image data to large-screen display in accordance with a display format.

The large-screen display is one that is disposed in large-scale institutions such as baseball fields, gymnasiums and the like.

2. Description of the Related Art

FIG. 1 shows a conventional large-screen display system which comprises a display 10 and a TV image processing unit 12. The display 10 includes a display panel 15 on which plurality of light emitting elements 14 are arranged in matrix with a group of drivers 16, each for driving the corresponding one of the light emitting elements 14.

On the other hand, the image processing unit 12 comprises a sampling section 18 which receives an analog TV signal and converts the analog TV signal into a digital image signal which is in turn outputted therefrom to the display 10. The image processing unit 12 also includes a timing controller 20 which provides a clock 100 to the sampling section 18, and at the same time a timing signal 102 to the display 10.

FIG. 2 shows the detailed structure of one driver 16 in the display system of FIG. 2. This may be one that is described, for example, in Japanese Patent Laid-Open No. 56-4185.

The driver 16 includes a down-counter 22 which receives 6-bit image data 103 from the sampling section 18 shown in FIG. 1. The down-counter 22 also receives a setting signal which is the timing signal 102 outputted from the timing controller 20 (see FIG. 1). When the down-counter 22 receives the setting signal 102, the 6-bit image data 103 Is loaded into the down-counter 22. At the same time, a flip flop 24 is switched on by the setting signal 102. Thus, the down-counter 22 begins to count the number of clocks 104. If the counts of the down-counter 22 reach the number of bits in the loaded image data, the down-counter 22 then outputs a coincidence signal to the flip flop 24 which is in turn switched off by the coincidence signal.

In such a manner, the corresponding one of the light emitting elements 14 will be lighted on only when the flip flop 24 is in its ON state.

Since the image data 103 has 6 bits, the time through which the light emitting element 14 is lighted on can be set in sixty-four steps.

In FIG. 1, each of the light emitting elements 14 is a lamp for emitting a light with either of three primary colors RED, BLUE or GREEN, these colored lamps being suitably arranged to form the display panel.

Since image data is provided in parallel from the sampling section 18 to all the drivers 16, the conventional large-screen display system as shown in FIG. 1 must perform the high-speed transmission and control of the image data.

An improved large-screen display system which intends to overcome the above-mentioned problem has been proposed, such that described by Japanese Patent Laid-Open No. 60-237774. Such an improved large-screen display system is illustrated in FIG. 3. The display system comprises a display 26 which is divided into three horizontal blocks 26a, 26b and 26c. Each of these blocks includes a plurality of modules 28 each of which includes a number of drivers and a number of light emitting elements, as described with reference to FIGS. 1 and 2. In each of the blocks, the modules 28 are connected with a bus 30.

The display system also comprises a TV image processing unit 32 which includes a sampling section 18 for receiving an analog TV signal 106 and outputting digital image data for each of the color components and buffer memory sections 36a, 36b and 36c, each located therein for the corresponding one of the blocks 26a, 26b and 26c. The sampling section 18 receives timing clocks 100 from a timing controller 20 in the image processing unit 32. The imaging processing unit 32 further comprises buffers 44 and terminators 46, all of which are disposed within the respective blocks 26a, 26b and 26c.

FIG. 4(a) illustrates a TV signal 106; FIG. 4(b) illustrates image data digitized in the sampling section 18; FIG. 4(c) illustrates a portion of the image data which is enlarged in the direction of time axis; and FIG. 4(d) illustrates clocks 108 outputted from the timing controller 20.

As can be seen from FIG. 4(c), the sampling section 18 outputs image data for each of the color components. In each of the image data, the forwardmost letter "R", "G" or "B" indicates the corresponding one of the color components. The third letter "1" indicates the first field in the display and the fourth and fifth letters represent serial addresses for the respective color components.

FIG. 5(a) illustrates an analog TV signal 106 in which the effective period 110 within one horizontal scan period H is divided into three sub-periods $H_1$, $H_2$ and $H_3$. FIG. 5(b) illustrates various ranges of time in the image data stored in the buffer memory sections 36a, 36b and 36c. More particularly, the buffer memory section 36a stores image data within a time period $W_1$; the buffer memory section 36b stores image data within another time period $W_2$; and the buffer memory section 36c stores image data within still another time period $W_3$.

The image data stored in each of the buffer memory sections 36 is read out from a time period $P_1$, $P_2$ or $P_3$ following the respective one of the writing periods and supplied to the corresponding one of the blocks 26a, 26b and 26c through a bus 40.

As can be seen from FIG. 5(b), the read-out of image data from the respective buffer memory sections 36 can be performed with a sufficient time at a relatively low speed. Such an arrangement is thus advantageous in that the buses 30 may be constructed as by the use of flat cables having less high-frequency characteristics.

As the stored image data is read out and outputted, each of the buffer memory sections 36 functions to add an address number data with respect to each scanning line to the leading end of that image data. Based on such an address number data added to the leading end of the image data, therefore, each of the modules 28 can judge whether or not the image data is one transmitted to itself.

The display system 26 operates in an interlaced scanning mode as in the prior art.

FIG. 6 shows two typical display formats in the prior art, wherein one display format denoted by (I) is defined to be the first display format while the other display format designated by (II) is defined to be the second display format.

In FIG. 6, a character-string in each of the boxes represents an address of the image data applied to the corresponding one of the light emitting elements. More particularly a character-string "B0101" shown by 200 in FIG. 6 indicates a blue color by the character "B" and an address of the first image data at the first field by "0101". This data corresponds to the image data 200' shown in FIG. 4(c).

In FIG. 4(c), only the image data "B0101," among the first image data for the respective colors, is used with the remaining image data) "R0101" and "G0101") being discarded. In other words, the first display format is adapted to a large-screen display including a relatively small number of light emitting elements and more particularly to a display including up to about 640×480 pixels. With the TV signal being in the form of an NTSC signal, if the number of light emitting elements measured in the direction of horizontal scan on the display is equal to 640, the frequency in the sampling clocks 108 may be equal to about 12.5 MHz.

In order to accommodate for more than 640×480 pixels, the first display format must use the sampling clocks at a higher speed. In such a case, however, the speed of the sampling clocks becomes higher than the transmission speed of the image data passed through the bus 42 shown in FIG. 3. This raises a difficulty in transmission of data.

Thus, the second display format is currently utilized. As can be seen from FIG. 6, the second display format (II) comprises a plurality of light emitting element sets, each of which includes four light emitting elements or pixels R, G, G and B. When a TV signal is sampled, image data for the respective color components is simultaneously displayed at the same sampling point. In other words, the second display format effectively utilizes the image data of all the colors. Even if the second display format uses the same speed of sampling clock as in the first display format, a former may adapt to a display having the number of light emitting elements four times that of the first display format. It is to be noted that the second display format provides and simultaneously displays the image data of green to two light emitting elements.

In the prior art, thus, one of the two display formats was selected depending on the number of light emitting elements used in a large-screen display. Thus, the large-screen display system used a TV image processing apparatus of the type corresponding to the selected display format.

Recently, large-screen displays are being installed in various types of out-door and in-door institutions such as sports stadiums, gymnasiums and the like. The large-screen displays are dimensioned depending on the application for which they are to be used. A display format is selected depending on the size of the large-screen display used therein.

However, the television image processing apparatus used in a large-screen display system can adapt only to a display format which has been selected therefor. For another large-screen display having a different size, a different television image processing unit must be designed and manufactured. This results in an increase of manufacturing cost and becomes an obstruction that prevents large-screen displays from spreading. Since they attach importance to the provision of information based on images, it is desirable to provide a television image processing system which can be used in large-screen display having different sizes without any modification.

It is therefore an object of the present invention to provide a television image processing system which can selectively adapt to a plurality of display formats.

SUMMARY OF THE INVENTION

In order to accomplish the above object, the present invention provides a television image processing system which comprises command output means for outputting a command representing a display format in a display to be connected with the television image processing system, sampling means for receiving an analog color TV signal and inverting it into digital output image data for each of color components R, G and B, and at least one data array changing means for receiving said image data from said sampling means and for changing the array of said image data to an array corresponding to the display format indicated by said command, the image data in the changed array being then outputted to said display for each block.

In such an arrangement, the television image processing system can selectively adapt to one of plural display formats since the image data is converted into one compatible with the display format specified by the command at the data array changing means.

Even if a different display format is to be used, therefore, the television image processing system can be used without any modification as it is. This leads to a reduction of the manufacturing cost for the television image processing system.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 11 illustrates the first and second display formats to which the television image processing unit of the present invention can adapt.

DETAILED DESCRIPTION OF THE PREFERRED EMBODIMENTS

Figure 7:
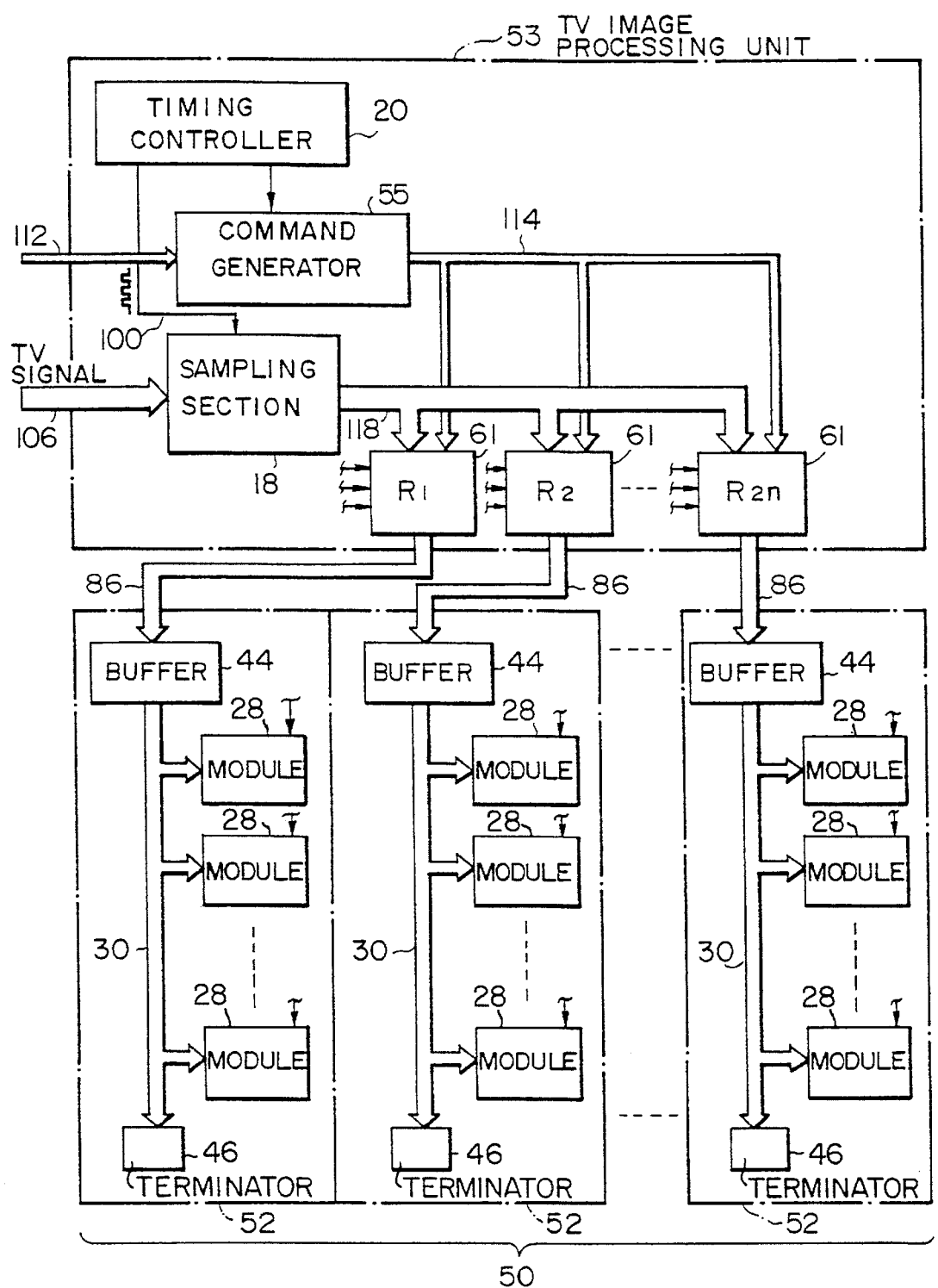
FIG. 7 is a block diagram of the entire arrangement of a large-screen display system incorporating a television image processing unit which is constructed in accordance with the present invention.

Referring first to FIG. 7, there is shown a large-screen display system which comprises a display 50 and a television image processing unit 53.

Figure 1:
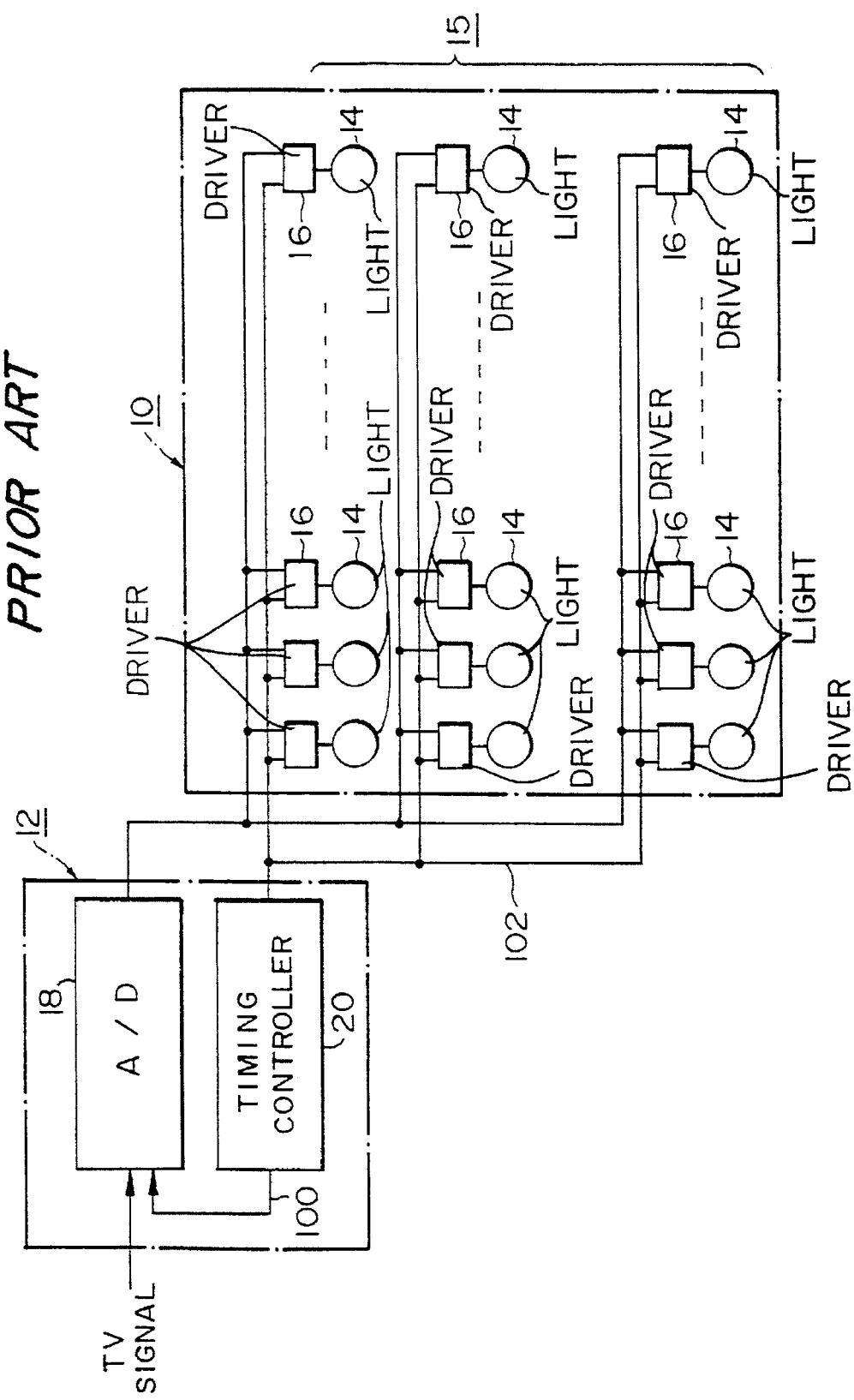
FIG. 1 is a block diagram of a conventional large-screen display.
Figure 2:
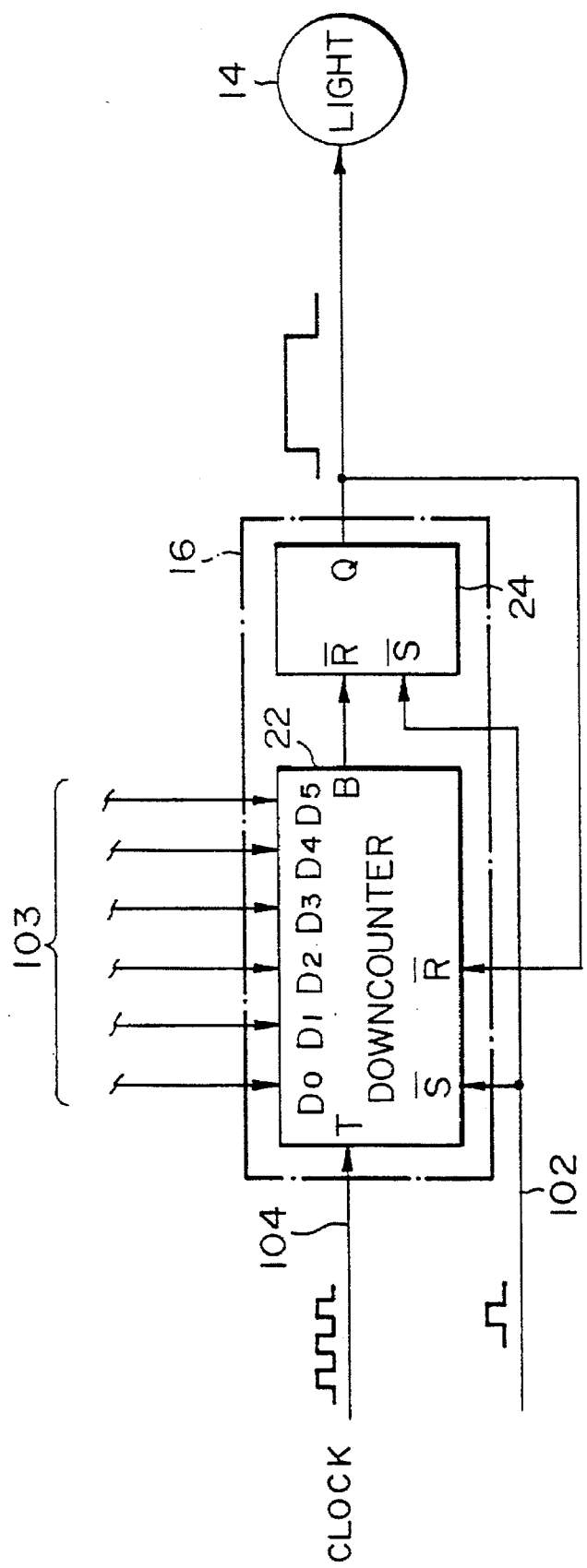
FIG. 2 is a block diagram of the details of a driver 22.
Figure 3:
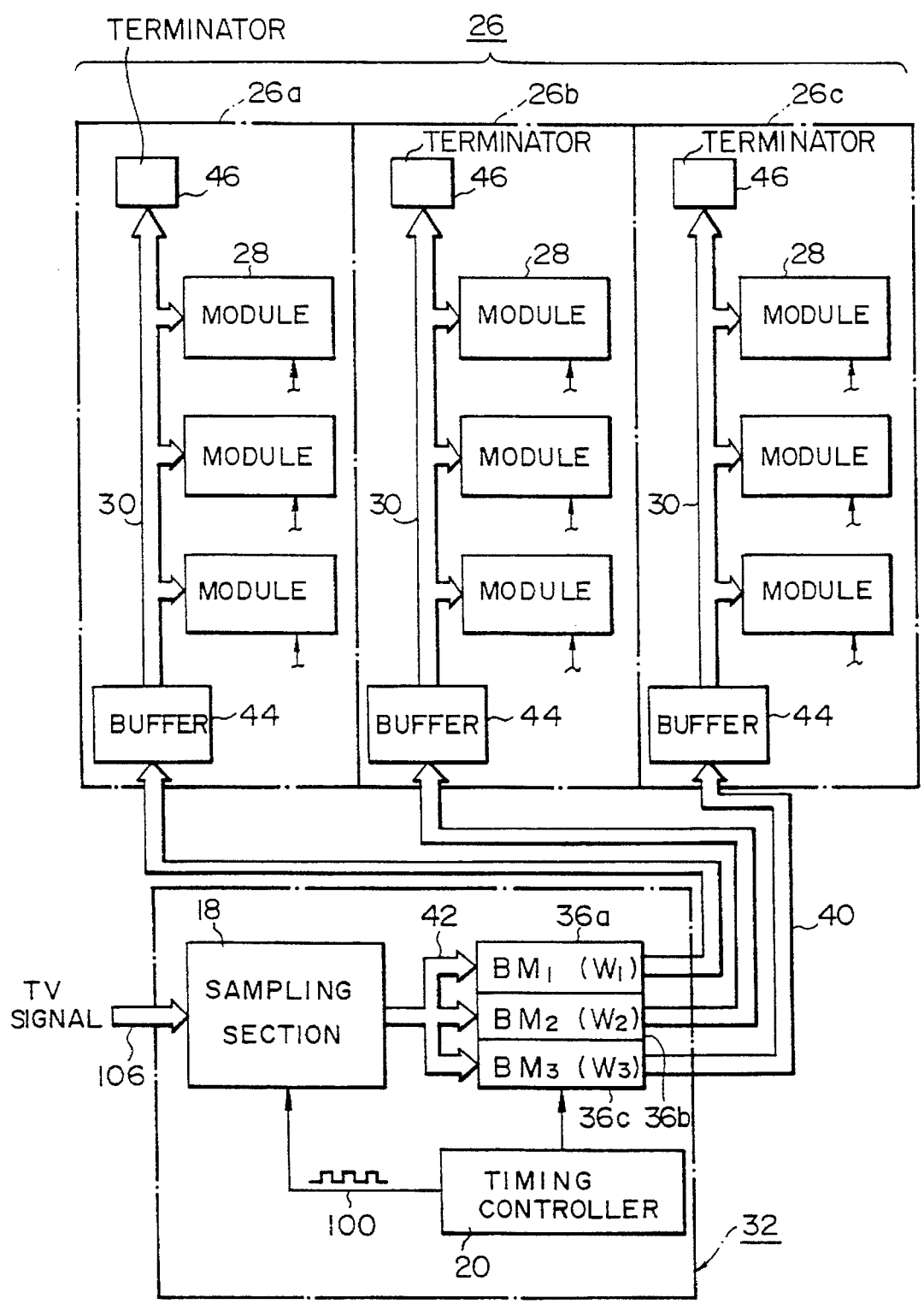
FIG. 3 is a block diagram of the entire construction of another conventional large-screen display.
Figure 4:
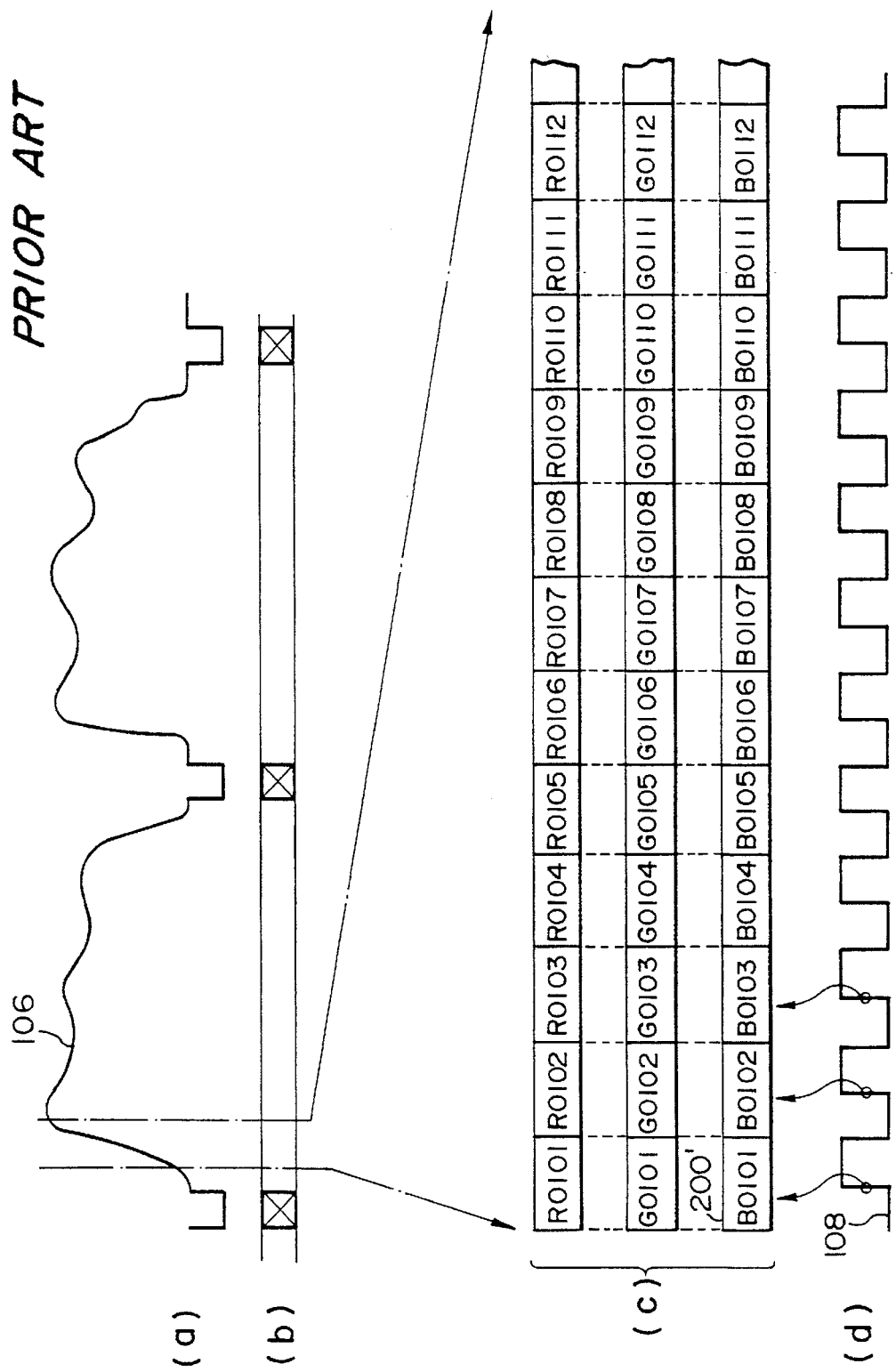
FIG. 4 is a timing chart illustrating an analog TV signal and a digital image data.
Figure 5:
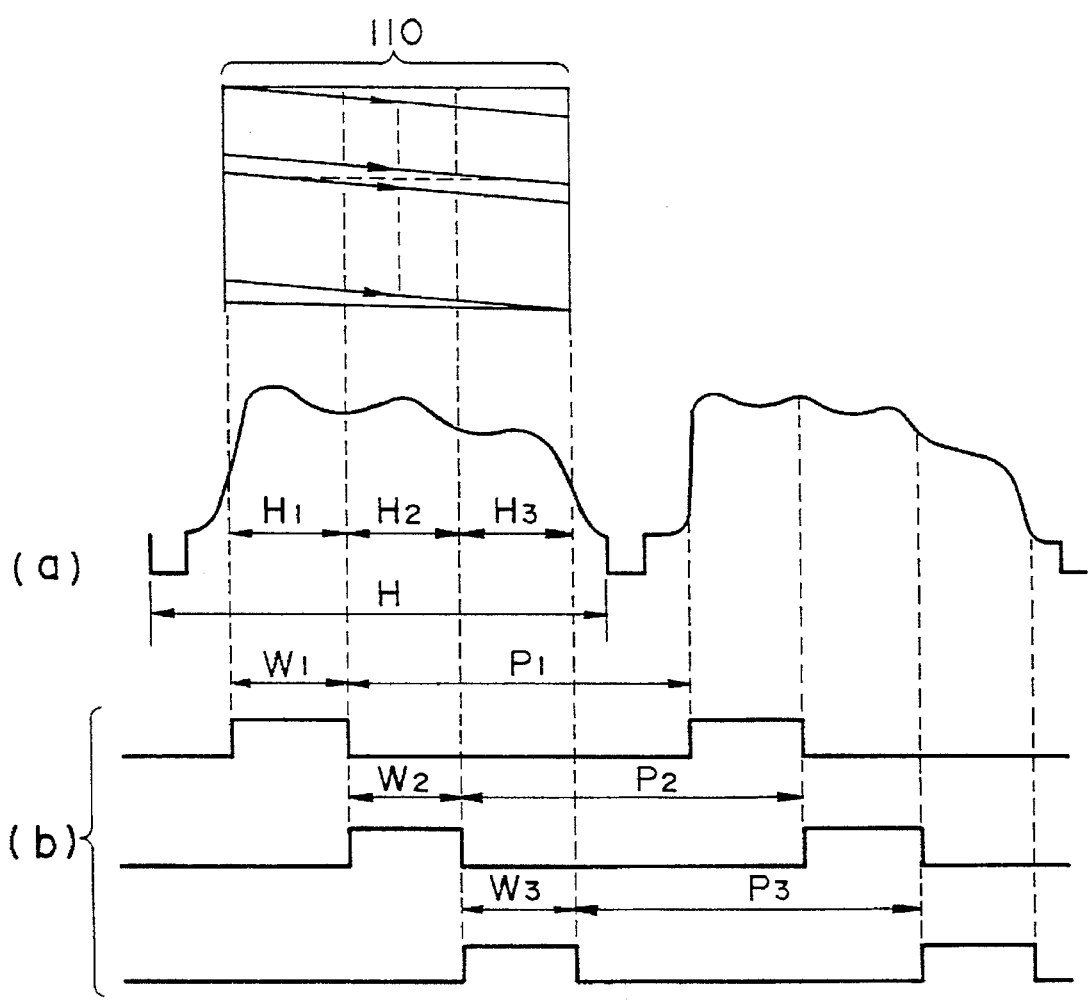
FIG. 5 is a timing chart illustrating periods in which data is extracted.

The display 50 is divided into a plurality of blocks 52 in the horizontal scan direction. Each of the blocks 52 includes a plurality of modules 28, each of which is similar in arrangement to the module 28 shown in FIG. 3 and as includes a plurality of light emitting elements (not shown) and a plurality of drivers (not shown) each for driving the corresponding one of the light emitting elements.

In each block, the modules 28 are connected with a bus 56 which is in turn connected, at one end, with a buffer 44, the other end of the bus 30 being connected with a terminator 46.

The television image processing unit 53 comprises a command generating section 55 and a color separation type sampling section 18. The command generating section 55 receives an external setting signal 112 for setting a display format and then outputs a command signal 114 representing the display format specified by the external setting signal 112. In the illustrated embodiment, the television image processing unit 53 can selectively adapt to the first and second display formats mentioned above. The display 50 connected to the television image processing unit 53 may be actuated in both the first and second display formats.

The sampling section 18 receives an analog TV signal 106 and converts the analog signal into digital image data for each color component, the digital image data then being outputted in parallel. The sampling is carried out in synchronism with sampling clocks 100 from a timing controller 20.

The image data from the sampling section 18 is then applied to a plurality of array changing sections 61 which are equal in number to the blocks 52 in the display 50. More particularly, if the display 50 connected with the television image processing unit 53 adapts to the second display format, all the array changing sections 61 represented by $R_1$–$R_{2n}$ are used in operation. If the display 50 is used in the first display format, half of all the array changing sections 61 represented by $R_1$–$R_n$ are used in operation. Although not illustrated, the television image processing unit 53 is connected with the display 50 through flat cable connectors equal in number to 2n.

Figure 8:
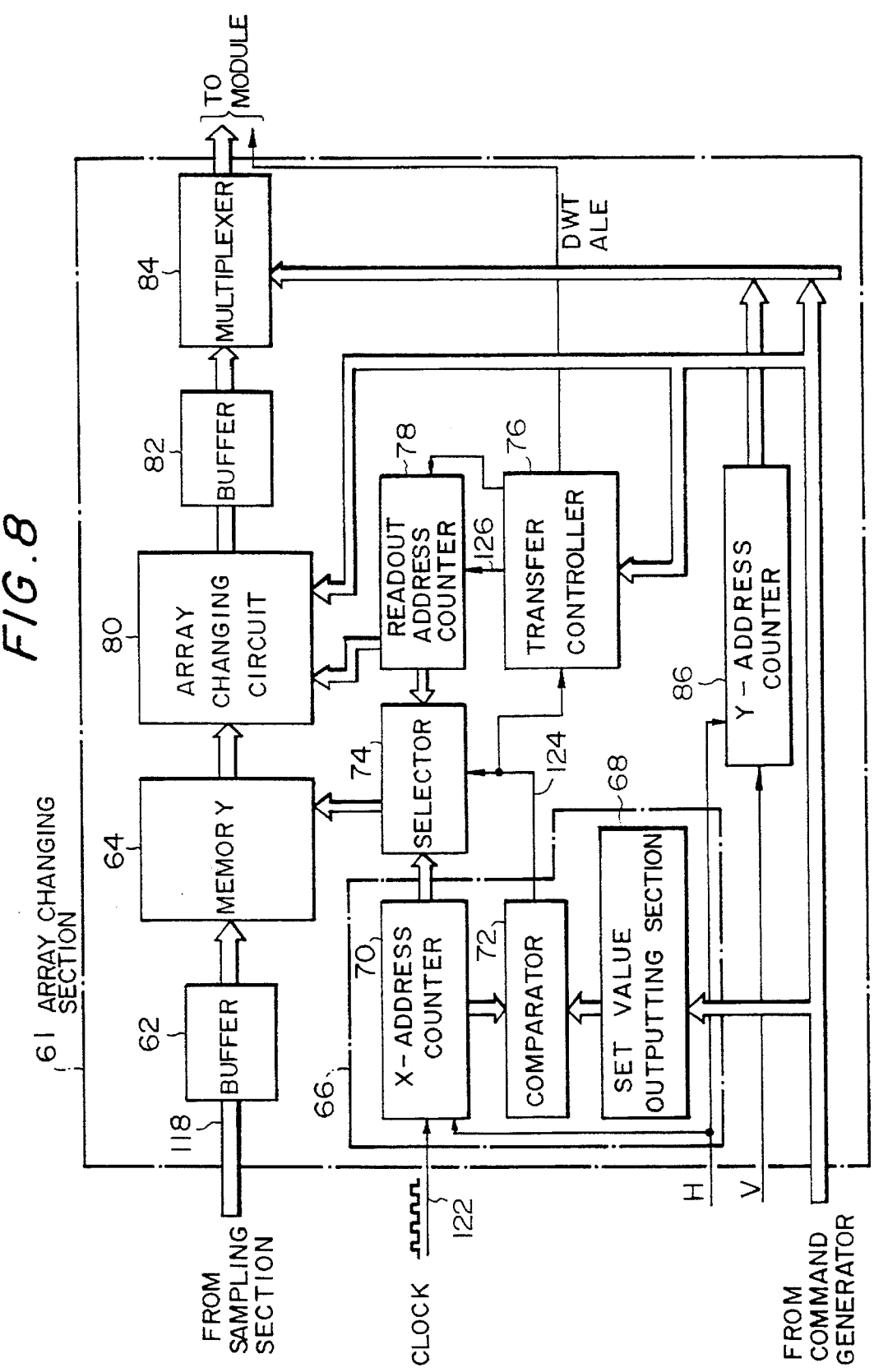
FIG. 8 is a block diagram of a data array changing section in the image processing unit of FIG. 7.

Referring now to FIG. 8, there is shown an array changing section 61 usable In the television image processing unit of the present invention. This array changing section 61 functions to perform the temporal storage of image data for changing the speed of data transfer, as in the buffer memory 36 of FIG. 3. The array changing section 61 also has a function of changing the display format from one to another, as will be described later.

The array changing section 61 comprises a buffer 62 and a memory 64 connected with the buffer 62, the image data 118 being supplied to the memory 64 through the buffer 62. The writing of the image data into the memory 64 is controlled by a data extracting section 66.

The data extracting section 66 comprises a set value outputting section 68, an X-address counter 70 and a comparator 72. A command signal from the command generating section 55 is inputted into the set value outputting section 68 which in turn outputs initial and final address values specified by the command signal to the comparator 72.

The initial and final address values are preset for each of the array changing sections 61 depending on the display format. This will be described in connection with FIG. 9.

Figure 9:
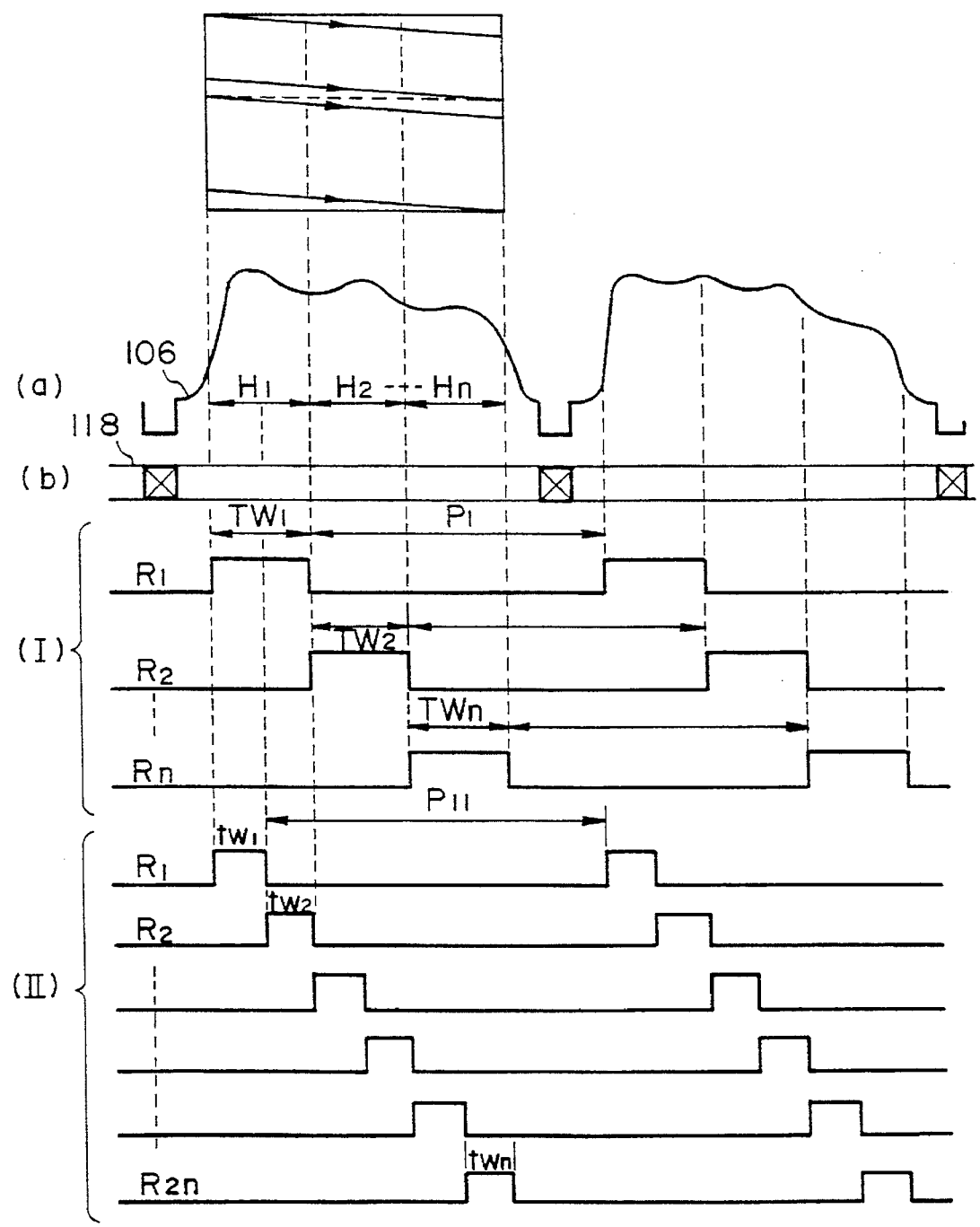
FIG. 9 is a timing chart illustrating times at which a plurality of data array changing sections operate.

FIG. 9(a) shows an analog TV signal 106 while FIG. 9(b) shows a digital image data 118 outputted from the sampling section 57. FIG. 9(I) shows periods of data extraction (TW) each of which is preset for each of the array changing sections 61 when the display is in the first display format. FIG. 9(II) shows periods of data extraction (tw), each of which is preset for each array changing section 61 when the display is in the second display format.

As can be seen from FIG. 9, image data is extracted through a period $TW_1$ in one horizontal scan period if the array changing section 61 is one shown by $R_1$ in FIG. 7. In other words, the image data within that period $TW_1$ is stored in the memory 64 in such a manner as will be described below.

The setting value outputting section 68 shown in FIG. 8 outputs initial and final addresses within the period TW of FIG. 9 in the horizontal scan direction.

In FIG. 8, the X-address counter 70 is reset by a horizontal synchronizing signal (H) and thereafter begins to count clocks 112. The counts of the X-address counter 70 are then supplied to the comparator 72 and a selector 74.

The comparator 72 applies a write enable ring signal 124 to the selector 74 if the counts of the X-address counter 70 are between the initial and final address values outputted from the set value outputting section 68.

In such a manner, the selector 74 will provide the counts of the X-address counter 70 to the memory 64. In other words, the output of the X-address counter 70 will determine an address in the memory 44 at which the image data 118 is to be written.

Now assume that the first display format is set by the command generating section 55 and that an array changing section 61 is $R_1$ shown in FIG. 7. Image data within the period $TW_1$ shown in FIG. 9 will be sequentially written into the memory 64. Similar operations will be performed under the other conditions.

If the counts of the X-address counter 70 exceed the final address value set by the set value outputting section 68, the comparator 72 terminates the output of the write enable ring signal 124. Thus, the selector 74 also terminates its output to the memory 64.

The signal 124 is monitored by a transfer controller 76. When the output of the signal 124 is stopped, the transfer controller 76 first clears a readout address counter 78 and then provides a clock signal 126 to the readout address counter 78. This clock signal 126 is the same as the write signal (DWT) provided to each of the modules 28 in the display and has a speed later than that of the sampling clock signal 100 supplied to the sampling section 18.

The readout address counter 78 counts the clocks 126, the counts thereof being then provided to the memory 64 through the selector 74 as a readout address.

Figure 10:
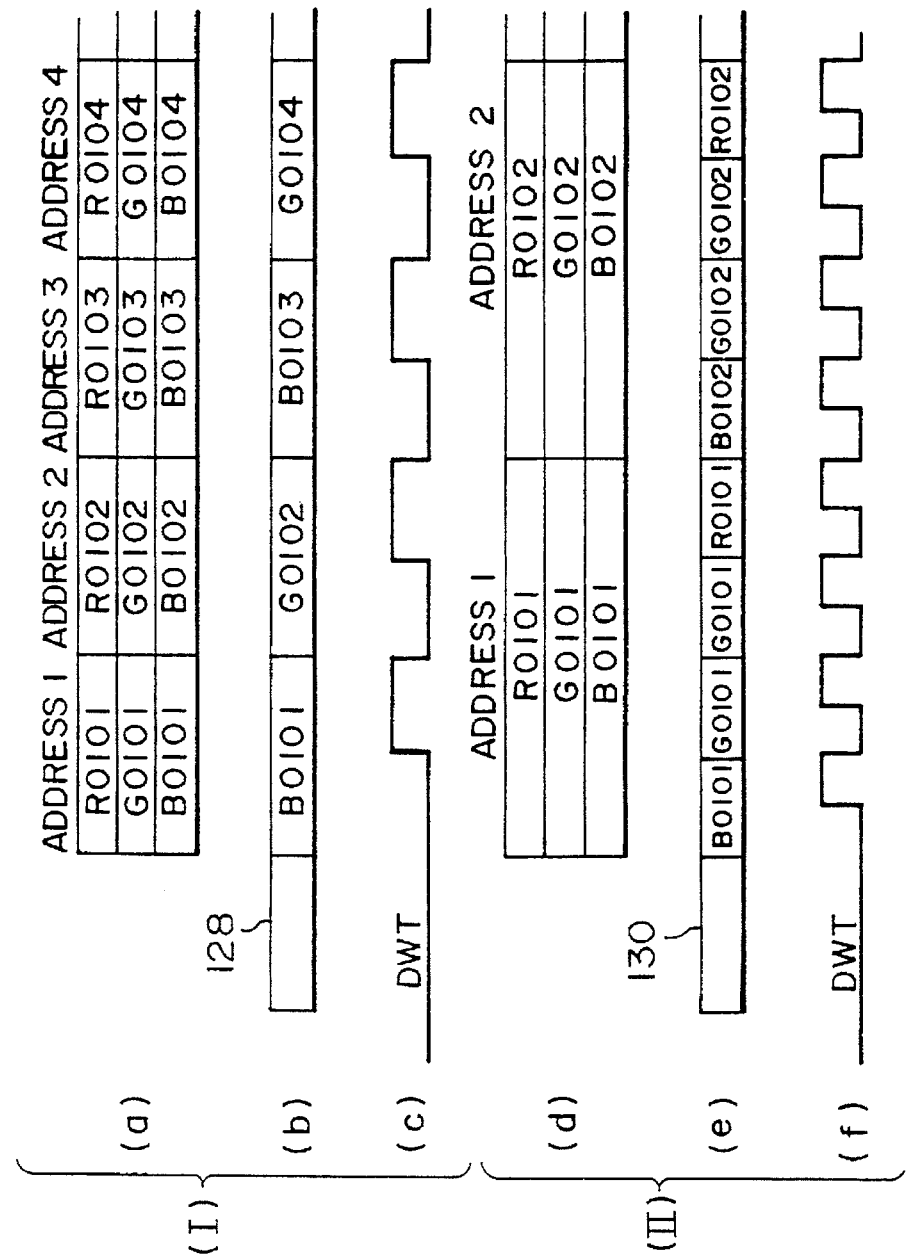
FIG. 10 illustrates arrays of image data in the first and second display formats.

FIGS. 10(a) and (b) illustrate the image data read out from the memory 64. FIG. 10(I) shows the case of the first display format while FIG. 10(II) shows the case of the second display format.

As can be seen from comparison between FIGS. 10(a) and (d), the second display format enables the image data to be read out from the memory 64 through a time period two times that of the first display format, that is, at a speed one-half that of the first display format. In the illustrated embodiment, the first display format utilizes the array changing sections 61 equal in number to n, while the second display format utilizes the array changing sections 61 equal In number to 2n. As shown in FIG. 9, therefore, the period of data extraction TW is assigned to each of the array changing sections 61 in the first display format while the period of data extraction tw (=TW/2) is assigned to each array changing section 61 in the second display format. It will be thus understood from the foregoing that the speed of readout of the image data from the memory 64 depends on the type of display format.

Referring again to FIG. 8, the image data read out from the memory 64 is supplied to an array changing circuit 80 which also receives the counts of the readout address counter 78. From such inputted counts, thus, the array changing circuit 80 can know to which light emitting element address the image data corresponds in the display 50. The array changing circuit 80 executes the changing of image data array, based on a command from the command generating section 55. More particularly, with the first display format, the array changes circuit 80 selects a given image data from each of the image data addresses shown in FIG. 10(a) and changes it to an array of data shown in FIG. 10(b).

With the second display format, the image data shown in FIG. 10(d) is changed to an array of data shown by FIG. 10(e). The changed array of data is then applied to a multiplexer 84 through a buffer 82.

It will be apparent from this that in the second display format, the image data is handled at a speed two times that of the first display format (see FIGS. 10(b) and (e)). However, the increase of transfer speed will not cause any obstruction in the circuit.

Referring to FIG. 10, the arrays of data from the array changing circuit 80 have forwardmost addresses 128 and 130 respectively added thereto, these addresses representing ones in the vertical scan direction, as in the prior art (see FIGS. 10(b) and (e)).

The forwardmost addresses 128 and 130 are generated by a Y-address counter 86. The Y-address counter 86 is reset by a vertical synchronizing signal (V) and counts horizontal synchronizing signals (H). The counts of the Y-address counter 84 are fed to the multiplexer 84. The multiplexer 84 will perform the addition of the fed forwardmost addresses to the arrays of data.

The image data (image data array) so processed is supplied from each of the array changing sections 61 to the corresponding one of the blocks 52 in the display 50 through a bus. 86, as shown in FIG. 7. In each block 52, each of the modules 28 confirms the forwardmost address in the supplied image data and takes it in if the image data is one to be assigned to the module 54. Thus, the corresponding light emitting element will be driven as In the prior art. In such a case, an address latch enable signal (ALE) and a write signal (DWT) have been supplied from the transfer controller 76 to each of the modules (see FIGS. 10(c) and (f)).

In the set value outputting section 68 shown in FIG. 8, the setting of the initial or final address value may be performed by storing only the set value in the first display format or by dividing the set value in the first display format into one-half and outputting them in the second display format. In such a case, if the set value has been stored in binary number, the above operation may be easily made by shifting the set value lower by one bit. Furthermore, the command may be provided to the display with the image data so as to confirm the array of the supplied image data at each of the modules in the display.

Figure 6:
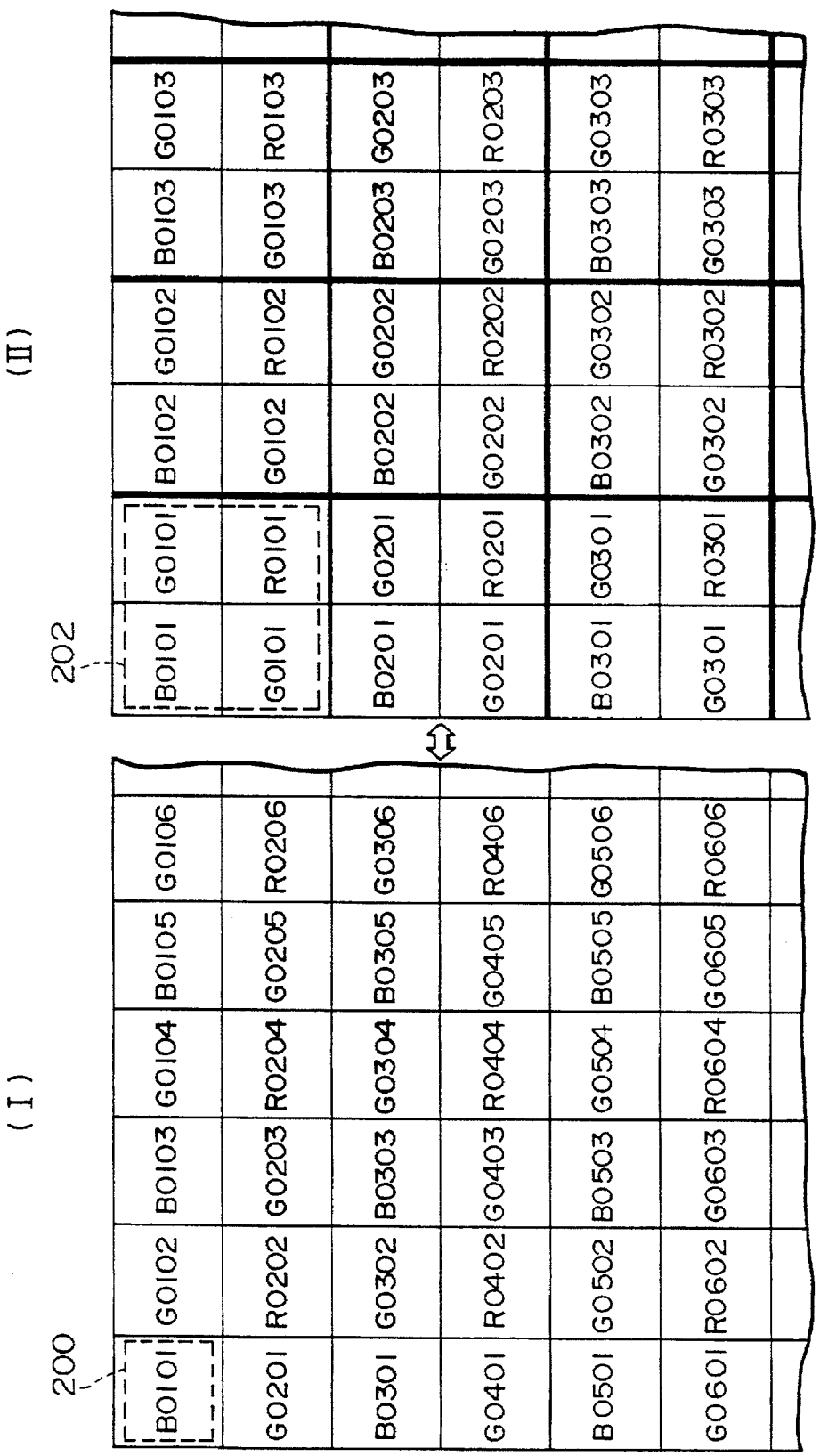
FIG. 6 illustrates the first and second display formats.
Figure 12:
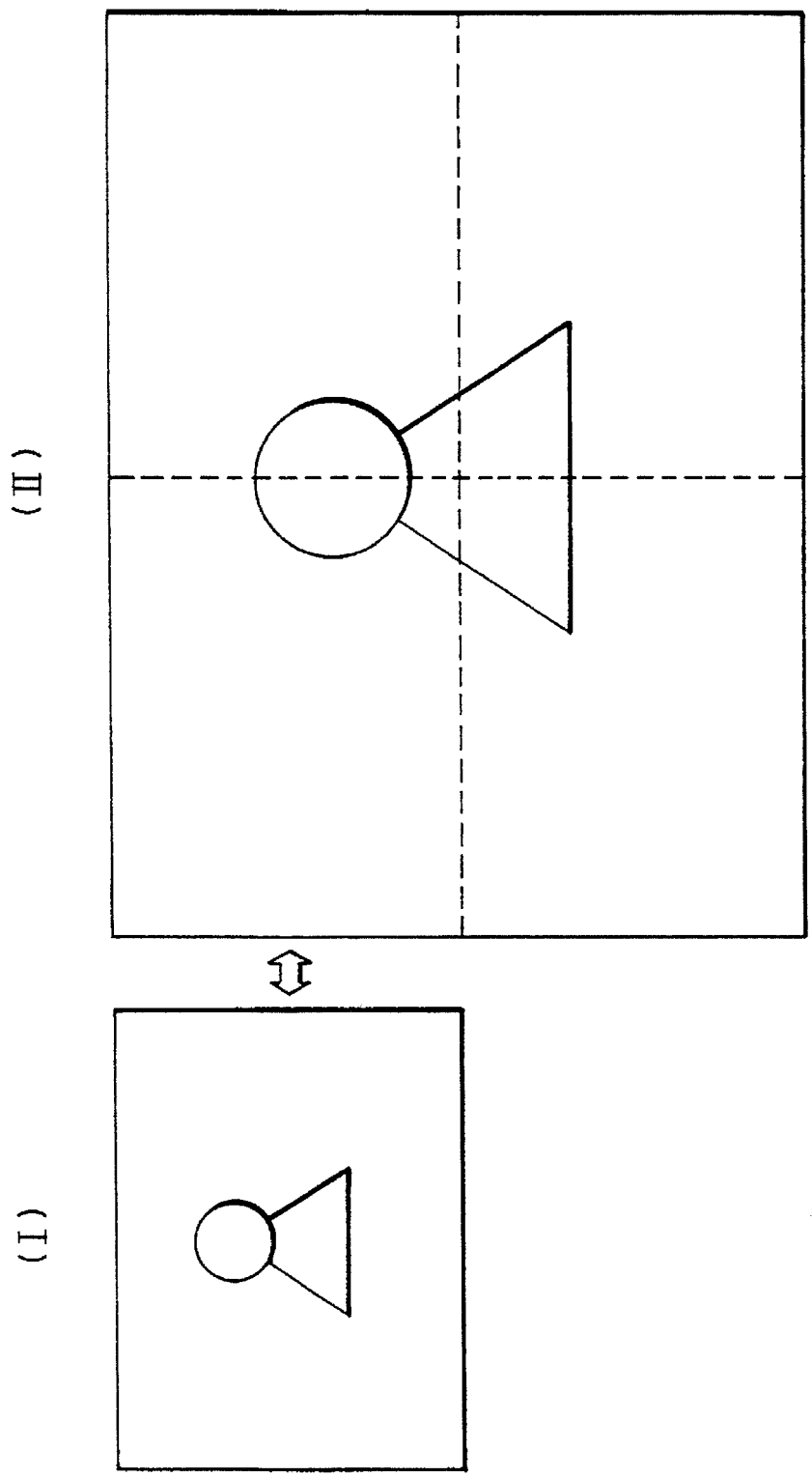
FIG. 12 is a schematic view illustrating different examples of display according to the first and second display formats.

FIG. 11 illustrates display formats which can be performed in the large-screen display constructed in accordance with the present embodiment: FIG. 11(I) shows the first display format and FIG. 11(II) shows the second display format. These formats are completely the same as those of FIG. 6. From FIG. 11, It will be understood that the single image processing unit 53 of the present invention can realize two display formats. Moreover, FIG. 12(I) exemplifies a shape formed according to the first display format while FIG. 12(11) illustrates another shape formed by the use of the number of light emitting elements four times that in the first display format in accordance with the second display format.

Although the image processing has been described with regard to the first and second display formats, the present invention is not limited to such a case and can be applied similarly to any other type of display format. In any event, the number of array changing sections 61 should be equal to the maximum number of blocks in displays which can be connected with the television image processing system 53 constructed in accordance with the present invention. However, where the array changing sections 61 are in the form of a card-like substrate and the television image processing unit 53 includes a plurality of slots each for receiving a card-like array changing substrate, the number of card-like substrates equal to the number of blocks in a display may be inserted into the respective slots in the image processing unit 53 such that the latter can adapt to the type of display format In that display. Thus, the image processing unit can be economically used only by utilizing the minimum of the array changing sections corresponding to any display format in that display.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A television image processing system selectively connected to one of a plurality of types of displays, each type of display having at least one of a plurality of different resolution formats determined by the number of light emitting elements used therein and also by the arrangement of colors used therein, the light emitting elements being grouped into a plurality of blocks in the horizontal scan direction, the television image processing system assigning and outputting image data within one horizontal period to the respective blocks in said one display, and the television image processing system comprising:

(a) command output means, responsive to an external resolution format selection signal, for outputting a command signal representative of a selected one of the plurality of different resolution formats of the connected display as a function of the external resolution format selection signal;

(b) sampling means for receiving an analog color TV signal and for outputting digital image data for each of color components R, G and B; and (c) at least one data array changing means, each for receiving the digital image data from said sampling means in parallel, each for changing a display array of said digital image data to a display array of data compatible with the display format selected by said command output means, the changed array of digital image data being then outputted to respective display blocks in said connected display, one corresponding to each of the at least one data array changing means, wherein each data array changing means includes a temporal storage device for digital image data to accommodate data transfer speed changes based upon selected resolution format, each data array changing means, when forming an array of lower resolution format data, forms the array of lower resolution data directly by selectively filtering an array of higher resolution format data.

2. The television image processing system of claim 1, further comprising a plurality of said data array changing means and wherein the number of said data array changing means is equal to the maximum number of blocks in said displays which are connectable with said television image processing system, whereby only the data array changing means equal in number to the blocks in any connected display can be actuated.

3. The television image processing system of claim 2 wherein each of said data array changing means includes data extracting means responsive to said command output means for extracting the image data within an assigned period of extraction from all the image data outputted from said sampling means in one horizontal scan period; buffer memory means for temporally storing said extracted image data; and change executing means for receiving image data read out from said buffer memory means and for changing the image data to an array of data compatible with the display format specified by said command output means.

4. The television image processing system of claim 3 wherein said data extracting means includes address setting means responsive to said command output means for outputting a start address and an end address in said period of data extraction; address counter means for counting clocks from the beginning of one horizontal scan period; and comparator means for receiving said start and end addresses from said address setting means and for outputting a write signal enabling the image data to be written in said buffer memory means if the output signal of said address counter means is between said start and end addresses.

5. The television image processing system in claim 4 wherein the displays connectable with said television image processing system include a display actuatable in accordance with a first resolution format and a display actuatable in accordance with a second resolution format and wherein the number of light emitting elements in said first resolution format display is equal to four times the number of light emitting elements in said second resolution format display.

6. A large-scale television display image processor apparatus for providing appropriate resolution display data to at least a selected one of a plurality of separately connectable displays, said large-scale television display image processor apparatus supporting at least a first resolution format and a second resolution format, comprising:

a digitizer for digitizing an analog color television signal into digital image data;

digital array forming means, responsive to the digitizer, for generating a basic digital image array having the first resolution format;

a controller, responsive to an external resolution format selection signal, indicating a selected display resolution format, and to the digital array forming means, for supplying the selected display with a corresponding resolution digital array having an appropriate resolution format based upon the basic digital image array and the external resolution format selection signal;

the corresponding resolution digital array being one of at least the first and second resolution formats, first resolution format being of greater resolution than the second resolution format; and when the corresponding resolution digital array is to be of lower resolution than the first resolution format:

the controller produces the corresponding resolution digital array directly by selectively filtering data out of the basic digital image array until a desired resolution is obtained.

7. An apparatus as in claim 6, wherein:

the digital image data from the digitizer includes R, G, and B components.

8. The apparatus as in claim 6, wherein the displays connectable thereto include:

a first display supporting the first resolution format; and a second display supporting the second resolution format; wherein a number of light emitting elements in said first resolution format display is equal to four times the number of light emitting elements in said second resolution format display.

9. In a large-scale television display image processor, a method for providing appropriate resolution display data to at least a selected one of a plurality of separately connectable displays, said large-scale television display image processor apparatus supporting at least a first resolution and a second resolution, comprising the steps of:

(a) digitizing an analog color television signal into digital image data;

(b) generating, from the digital image data, a basic digital image array having the first resolution format;

(c) receiving an external resolution format selection signal;

(d) supplying the selected display with a corresponding resolution digital array, as a function of the basic digital image array and the external resolution format selection signal;

the first resolution format being of greater resolution than the second resolution format; and when the corresponding resolution digital array is to be of lower resolution than the first resolution format:

the step (d) produces the corresponding resolution digital array directly by selectively filtering data out of the basic digital image array until a desired resolution is obtained.

10. A method as in claim 9, wherein:

the step of digitizing produces digital image data including R, G, and B components.

11. The method as in claim 9, wherein the displays connectable with the display image processor include:

a first display supporting first resolution format; and a second display supporting the second display format; wherein a number of light emitting elements in said first resolution format display is equal to four times the number of light emitting elements in said second resolution format display.

* * * * *